(12) United States Patent
Limpert

(10) Patent No.: US 11,788,572 B2
(45) Date of Patent: Oct. 17, 2023

(54) CONNECTING DEVICE

(71) Applicant: ILLINOIS TOOL WORKS INC., Glenview, IL (US)

(72) Inventor: Alexander Limpert, Weikersheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/948,782

(22) Filed: Sep. 20, 2022

(65) Prior Publication Data
US 2023/0099237 A1 Mar. 30, 2023

(30) Foreign Application Priority Data

Sep. 22, 2021 (DE) ...................... 10 2021 124 550.8
Aug. 10, 2022 (DE) ...................... 10 2022 120 181.3

(51) Int. Cl.
*F16B 37/04* (2006.01)

(52) U.S. Cl.
CPC .................................. *F16B 37/044* (2013.01)

(58) Field of Classification Search
CPC ...................................................... F16B 37/044
See application file for complete search history.

(56) References Cited

U.S. PATENT DOCUMENTS

| 2,727,552 | A | * | 12/1955 | Chvesta | ................ | F16B 37/044 |
|---|---|---|---|---|---|---|
| | | | | | | 411/112 |
| 7,621,707 | B2 | | 11/2009 | Sbongk | | |
| 8,083,450 | B1 | * | 12/2011 | Smith | ................ | F16B 37/0842 |
| | | | | | | 411/173 |
| 11,098,745 | B2 | * | 8/2021 | Sbongk | ................ | F16B 37/042 |
| 11,512,732 | B2 | * | 11/2022 | Figge | ...................... | F16B 43/00 |
| 2008/0193251 | A1 | | 8/2008 | Shongk | | |
| 2016/0223009 | A1 | * | 8/2016 | Costabel | ............... | F16B 37/044 |
| 2022/0090614 | A1 | * | 3/2022 | Müller | .................. | F16B 37/044 |

FOREIGN PATENT DOCUMENTS

| DE | 102005032699 B4 | 8/2008 |
|---|---|---|
| DE | 102017128842 A1 | 8/2008 |
| EP | 0681110 B1 | 11/1995 |

* cited by examiner

*Primary Examiner* — Jason L Vaughan
*Assistant Examiner* — Amanda Kreiling
(74) *Attorney, Agent, or Firm* — THOMPSON HINE LLP

(57) ABSTRACT

A connecting device, in particular for connecting two components, includes a housing device, having an axial shaft portion delimiting a receiving space, and a radial flange portion having a screw through-passage terminating into the receiving space, wherein a face of the flange portion facing the shaft portion is a connecting wall, and a face of the shaft portion opposite the connecting wall is a fastening wall, wherein the axial shaft portion is adapted to be inserted into a through passage of a first component and a nut device is in particular axially displaceably and rotatably arranged in the receiving space, wherein the nut device can preferably only be inserted laterally into the receiving space.

11 Claims, 2 Drawing Sheets

CONNECTING DEVICE

TECHNICAL FIELD

The present invention relates to a connecting device and to a method for connecting two components to such a connecting device.

BACKGROUND

Connecting means for connecting a first component to a second component are disclosed in EP 0 681 110 B1 and in DE 10 2005 032 699 B4.

DE 10 2017 128 842 A1 also discloses connecting means for application in connections within a motor vehicle.

The yet unpublished patent application with application number DE 10 2021 109 163.2 provides a connecting device, in particular for connecting two components. This comprises a housing device, having an axial shaft portion delimiting a receiving space, and a radial flange section having a screw through-passage terminating into the receiving space, wherein a face of the flange portion facing the shaft portion is a connecting wall, and a face of the shaft portion opposite the connecting wall is a fastening wall, and a nut device displaceably arranged in the receiving space, wherein the axial shaft portion is adapted to be inserted into a through passage of a first component and the radial flange section is adapted with a sealing device to form a seal when a first component abuts the connecting wall and to form a seal when a second component abuts the fastening wall.

SUMMARY

One object of the present invention is to provide a connecting device that operates securely and reliably, also with regard to any user errors.

Yet another object of the present invention is to provide a sealing connecting device that offers an alternative to the connecting devices for connecting two components as known from the prior art.

Yet another object of the present invention is to form a simply constructed connecting device by which two plate-shaped components can be connected to one another to form a seal.

A further object of the present invention is to provide a method for connecting two components to form a seal by means of such a connecting device.

One or more of these problems are solved by the features of independent claims. Advantageous configurations are specified in the respective dependent subclaims.

The invention specifies a connecting device, in particular for connecting two components. The invention comprises a housing device, having an axial shaft portion delimiting a receiving space, and a radial flange section having a screw through-passage terminating into the receiving space, wherein a face of the flange portion facing the shaft portion is a connecting wall, and a face of the shaft portion opposite the connecting wall is a fastening wall, wherein the axial shaft portion is adapted to be inserted into a through passage of a first component and a nut device in particular axially displaceably and rotatably arranged in the receiving space, wherein the nut device can preferably only be inserted laterally into the receiving space.

Such connecting devices are often also referred to as spreader nuts. In this case, corresponding screw through-passages can be additionally adapted to insert nut devices. Such screw through-passages then have a cross section that approximately corresponds to the cross section of the nut device. Such weakening of the flange portion is unproblematic in operation.

However, if a user during the assembly operation exerts an excessive torque on a corresponding screw device due to a user error and thus on the nut device connected thereto, it can happen that a retaining element of the nut device exerts such a high force in the axial direction on a first component that deformations of a component to be connected occur in a region between the component and the screw through-passage for inserting the nut device into a housing device. This stamping effect may cause damage to the component. The present invention securely and reliably avoids such user errors because the nut device is laterally insertable into the receiving space. In this way, the preferably circular disk-shaped (or circular ring disk-shaped) flange portion likewise comprises a circular ring-shaped screw through-passage only in its center, and is otherwise free of recesses or is formed from a solid material throughout.

Exerting an excessive torque to a nut device by user error can in such a case also lead to a loss of the sealing effect in a connecting device forming a seal since a corresponding sealing lip in the area shown above can be deformed or even damaged by the retaining elements and/or one of the components to be connected. Such damage is also ruled out with the connecting device according to the invention. The invention therefore specifies that the nut device can only be inserted laterally into the receiving space.

The shaft portion may be approximately rectangular in cross-section, preferably square, and have a bottom wall that is connected to the flange portion by two diametrically opposed wall sections, wherein at least one and in particular two lateral insertion openings are formed between the wall sections, and wherein at least one and preferably both insertion openings are formed for laterally inserting the nut device into the receiving space.

The housing device thus comprises the flange portion, the wall sections and the bottom wall. In this way, the housing device is formed integrally. On devices wherein the housing device is formed as two parts that are connected to each other, for example with a clip connection, a user error—wherein a user exerts excessive force in axial or assembly direction on a nut device when introducing a screw device—can potentially cause a portion of the housing to be detached as a result, and the nut device is then pushed through in the assembly direction. Such a connecting device can then no longer be used. The integral adaptation of the housing device of the present invention reliably prevents such a pushing through of the nut device.

Accordingly, the invention only permits inserting the nut device laterally through the lateral insertion opening, orthogonally to the assembly or axial direction.

The nut device can comprise at least one and preferably two retaining elements extending radially outward, wherein—in a final assembly position—one plate-shaped component can be fixed between the retaining elements and the connecting wall and/or one further plate-shaped component can be fixed between the fastening wall and a screw head of a screw device.

The retaining elements have retaining surfaces that extend transversely to the axial direction.

Because the retaining surfaces extend approximately parallel to a surface of a component to be used, a secure and reliable connection is formed to the respective component.

In the area of the bottom wall, a pre-assembly receiving area for receiving the retaining elements of the nut device can be provided in a pre-assembly position, wherein the nut device can be arranged axially in a locally fixed position, wherein, when exerting a torque on a screw head of the screw device, an inner thread is cut into a bore of the nut device, such that an external thread of a screw device engaged with the inner thread of the nut device allows the nut device to be laterally rotated from the pre-assembly receiving area into an assembly region of the receiving space and the nut device is axially displaceable in the assembly region until the final assembly position is reached.

Alternatively, the bore may already comprise the inner thread.

Based on such a design, the two components are easily securely and reliably connectable to one another.

On the wall sections, in particular in the area of corners of the wall sections, the catching elements extending radially outward and preferably diametrically opposite one another can be provided for engaging behind a through passage of a component. These are preferably adapted for pre-assembly.

By way of the catching elements, the connecting device can be easily connectable to a first component in a pre-assembly position using the catching elements after a first component is inserted into a through passage.

In the context of the present invention, an assembly direction is defined as a direction that extends approximately orthogonally to a surface of a component delimiting a through passage.

The radial flange portion can be adapted with a sealing device for forming a seal when a component abuts the connecting device and/or for forming a seal when a second component abuts the fastening wall and/or for forming a seal by delimiting the screw through-passage.

By providing such a sealing device, a sealing connecting device for forming a sealed connection between two components is provided.

In addition, the screw through-passage is also sealed against a screw device. In this case, it can in particular be provided that the sealing device in the area of the fastening wall is approximately adapted in the manner of a cart wheel in a top plan view, and accordingly has outwardly projecting structures in the radial direction that extend in the axial direction.

The same sealing device further comprises a radially circumferential section arranged about the flange portion. In addition, the sealing device is provided with one or more and preferably with three sealing lips extending in the assembly direction, which are arranged circumferentially approximately concentrically radially in the area of the connecting wall.

A water-tight connecting device is thus provided because the radial flange portion is formed with a sealing device.

This connecting device also provides an alternative to connecting devices with overmolded seals, as known from the prior art.

The sealing device can be formed from a soft component, preferably from TPE, wherein an integral chemical bond can be made to the flange portion by means of a 2-component injection molding process.

In this way, a secure and reliable integral connection of the sealing device to the flange portion can be formed. The latter is also easily and cost-effectively produced in a single operation using a 2-component injection molding process.

Furthermore, the connecting device may comprise a captive retention device for holding the nut device in a pre-assembly region of the housing device.

For this purpose, spring-like retaining pins are formed on the axial walls of the nut device, wherein the bottom wall and the side wall portions have correspondingly adapted retention grooves in the pre-assembly region.

This captive retainer ensures that the nut device is captively arranged in the pre-assembly region after being inserted into the housing device. The captive retainer also securely and reliably prevents any unwanted displacement of the nut device in the receiving region during transport relative to the housing device. The device is then always in the same position when in use.

A further aspect of the present invention provides a connecting system, wherein the connecting system comprises a connecting device shown above, a screw device, and preferably an assembly tool for laterally inserting a nut device into a receiving area of the connecting device.

By means of such an assembly tool, the nut device can be easily laterally inserted into the connecting device.

In particular, it can preferably be provided for this purpose that the nut device comprises one, and preferably two, lateral receiving recesses for accommodating the fork-like assembly tool for laterally inserting the nut device into the receiving space.

Another aspect provides a method of manufacturing the inventive fastening device, comprising the steps of: injection-molding a housing device described above by means of a 1-component, and preferably a 2-component injection molding process for forming the housing device from a first plastic (hard component) and a sealing element from a second plastic (soft component), injection molding a nut device using a 1-component injection molding process.

The method of manufacture may preferably be carried out in a single manufacturing device having a plurality of machines, wherein the assembly tool is provided for laterally inserting the nut device into the housing device.

In addition, a flange portion of the housing device can comprise two blind holes in order to be retained by a gripping device of the manufacturing fixture such that the assembly tool can used to laterally insert the nut device through an insertion opening into a receiving space of the housing device.

By providing a single manufacturing device with multiple machines and tools, the inventive connecting device is easily, securely and reliably produced.

In particular, it can preferably be provided for this purpose that the nut device comprises one, and preferably two, lateral receiving recesses for accommodating the fork-like assembly tool for laterally inserting the nut device into the receiving space.

The invention also provides a method for connecting two components to a connecting device as described.

The method comprises the following steps:
laterally insert the nut device into a receiving space of the housing device of the connecting device,
insert the connecting device, in particular a shaft portion of the connecting device, into a through-passage of a first of the two components to be connected,
arrange a through passage of a second component on a flange portion of the connecting device,
insert a screw device into the through passage of the second component and into a conically tapered area of a sealing element of the connecting device,
penetrate the conically tapered area of the sealing element with the screw device, preferably by applying a torque to a drive of the screw device,
insert the screw device into the nut device of the connecting device, and
exert a torque on the screw device such that the nut device is rotated laterally from a pre-assembly region of the housing device into an assembly region of the screw device, and axially slide the nut device in the assembly region, form a positive-locking sealed connection between retaining elements of the nut device, the first component, the flange portion, the second component and a screw head of the screw device.

BRIEF DESCRIPTION OF THE DRAWINGS

The present invention will be described below on the basis of an embodiment shown in the figures.

DETAILED DESCRIPTION

Figure 1:
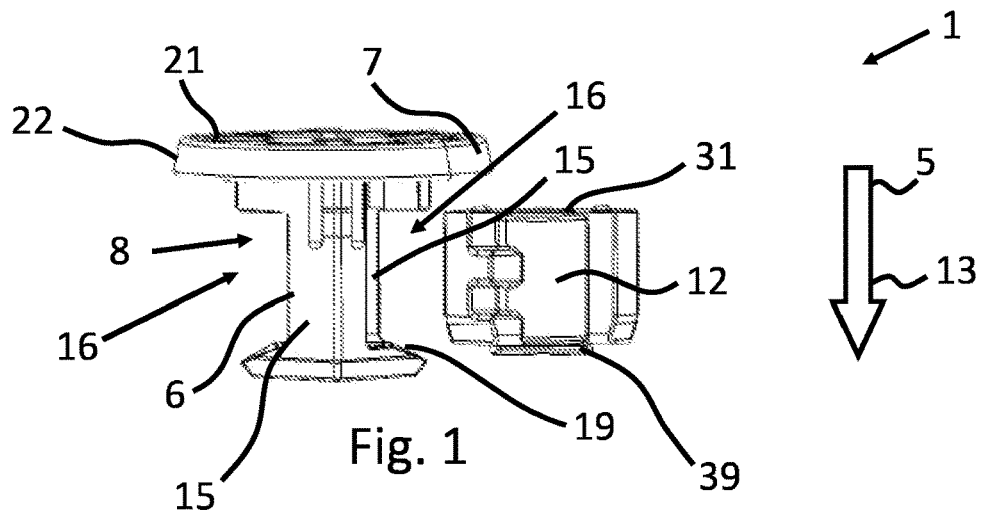
FIG. 1 an exploded perspective view of the connecting device with a housing device and a nut device, FIG. 2 a perspective view of the connecting device in a pre-assembly position, FIG. 3 a further perspective view of the connecting device in a pre-assembly position, FIG. 4 an inventive connecting system when connecting two components in a side view in a pre-assembly position, FIG. 5 a perspective view of the connecting system in a final assembly position, and FIG. 6 a further perspective view of the connecting system in a final assembly position.
Figure 2:
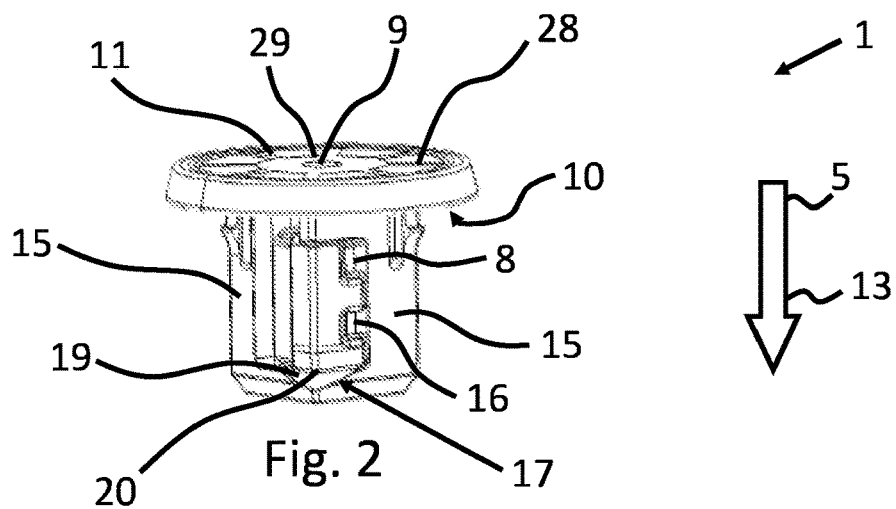
Figure 3:
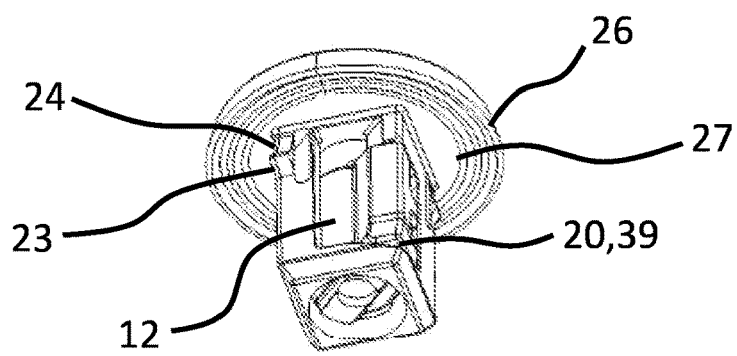
Figure 4:
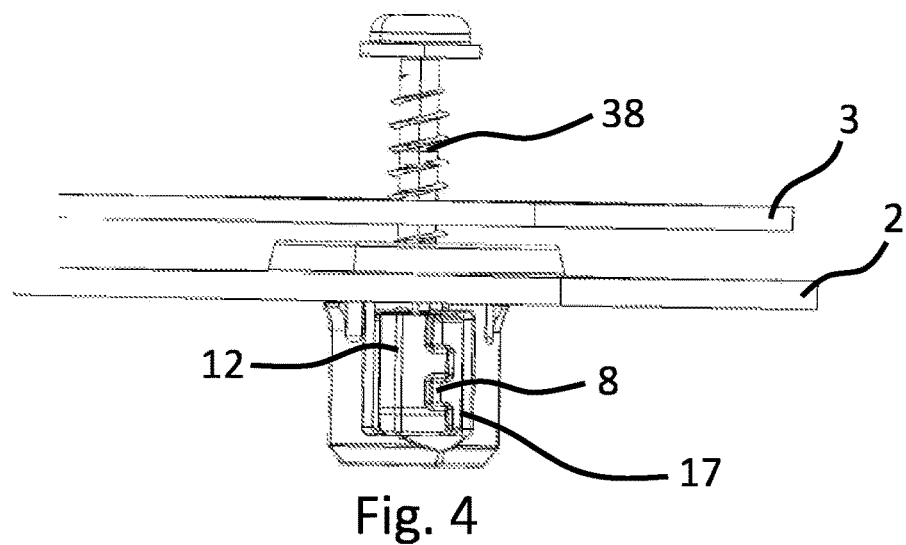
Figure 5:
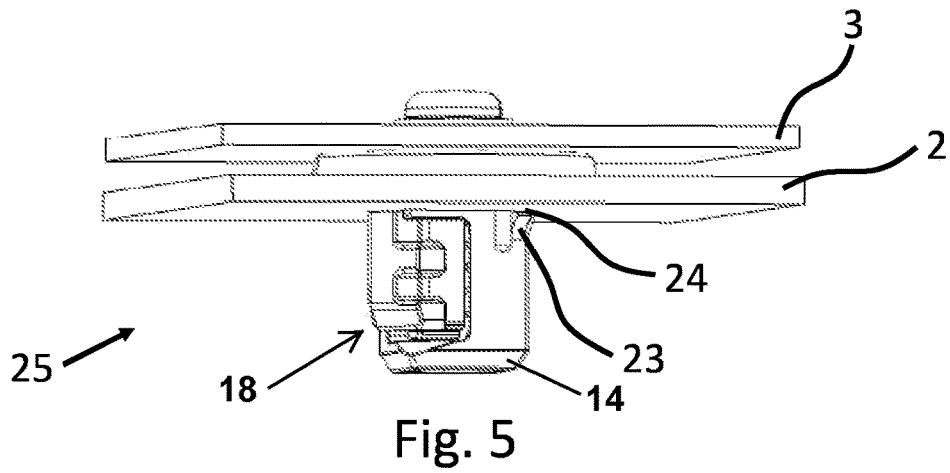
Figure 6:
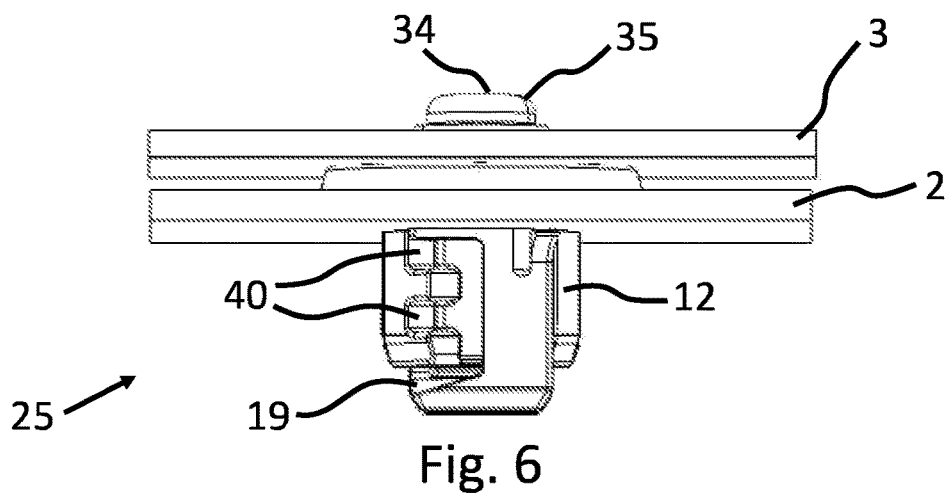

The following provides a more detailed description of the inventive connecting device 1 for connecting a first component 2 to a second component 3 based on an exemplary embodiment (FIGS. 1 to 6).

The connecting device 1 comprises a housing device 4 with a shaft portion 6 extending in an axial direction 5 and a radial flange portion 7 extending in a radial direction.

The flange portion 7 has an approximately circular disk shape and comprises a screw through-passage 9 at its center. Otherwise, the flange portion 7 is formed from solid material and is free of voids.

The shaft portion 6 is approximately cuboid and is adapted for insertion in an assembly direction 13 into a through passage of a first component 2, with a correspondingly adapted cross-section.

In the context of the present invention, the assembly direction 13 is defined as a direction that extends in axial direction 5 and approximately orthogonally to a surface of a component 2, 3 delimiting a through passage.

The shaft portion 6 in connection with the flange portion 7 delimits a receiving space 8.

A surface of the flange portion 7 facing the shaft portion 6 is referred to as connecting wall 10. A surface of the shaft portion 6 opposite the connecting wall 10 is referred to as the fastening wall 11.

The receiving space 8 is thus formed by the connecting wall 10 and a bottom wall 14, which are connected to each other by two connecting walls 15 that are diametrically opposite and formed at an angle.

Insertion openings 16 are formed in the region of the two connecting walls 15 located opposite to one another. The insertion openings 16 delimit a pre-assembly region 17 of approximately rectangular shape, which is delimited by a step in the area of the fastening wall 11.

The pre-assembly region 17 terminates into an assembly region 18 of the insertion opening 16, which is also approximately rectangular in shape.

An insertion slope 19 is formed at a corner of the bottom wall in the transition from the pre-assembly region 17 to the assembly region 18. The insertion slope 19 facilitates the insertion of a nut device 12 into the receiving space 8.

Captive retention grooves 20 are formed in the area of the inner corners of the connecting walls 15, as well as in axially aligned portions of the bottom wall 14.

A radially circumferential first, and second, overmolding edge 21, 22 is formed in the connecting wall 10 and in the fastening wall 11.

Furthermore, catching elements 23 extending radially outward and preferably arranged on the outer corners of the connecting walls 15 are formed on the connecting walls 15.

The catching elements 23 have corresponding locking surfaces 24, which extend in a final assembly position 25 approximately parallel to a surface of a component 2, 3 and are thus preferably arranged parallel to the flange portion in the final assembly position 25.

A sealing device 26 is formed radially circumferentially in the region of the first overmolding edge 21 and the second overmolding edge 22.

The sealing device 26 partially encloses the flange portion 7. In particular, three concentrically and radially circumferentially arranged sealing lips 27 extending in the assembly direction 13 are formed in the area of the fastening wall 11.

In the area of the connecting wall 10, the sealing device is adapted approximately like a cart wheel in a top plan view such that sealing struts 28 extend outward in the radial direction, wherein in the area of the screw through-passage 9, a screw sealing element 29 is also formed that delimits an insertion opening conically tapered in the assembly direction 13.

The nut device 12 can have a bore or a circular-cylindrical bore extending in the axial direction with an inner thread 31, wherein two retaining elements 32 extending radially in the outward direction are formed on the nut device 12.

The inner thread 31 of the nut device is preferably cut by a screw device 38 into the circular-cylindrical bore of the nut device 12 such that the bore of the nut device 12 is initially formed without a thread. The inner thread 31 can therefore be produced either in advance or preferably by means of the screw device 38.

The retaining elements each have a retaining surface 33, which extends opposite the assembly direction 13 to abut a component surface.

The nut device 12 can be inserted into the receiving space 8, respectively, in lateral direction through one of the two insertion openings 16, which also comprise the pre-assembly region 17 and the assembly region 18.

The pre-assembly region 17 is adapted such that when applying a torque to a drive 34 of a screw head 35 of a screw device 38 of an external thread 36 of the screw device 38 that is engaged with the inner thread 31 of the nut device 12, the nut device 12 can be rotated in the radial direction in the pre-assembly region 17 such that it can be transferred to the assembly region 18.

By exerting a further corresponding torque, the nut device 12 is displaced in the assembly region 18 opposite to the assembly direction 13 or in the axial direction 5, respectively, until the final assembly position 25 is achieved, wherein the retaining elements 32 abut a surface of a component 2 to be connected.

Further, the nut device 12 has captive retention springs 39 corresponding to the captive retention grooves 20 to captively arrange the nut device 12 in the receiving space 8 by means of a type of press fit.

Furthermore, according to the present invention, a connecting system is provided with a connecting device 1 described above, which also comprises the screw device 38 and an assembly tool (not shown) for laterally inserting the nut device 12 into the receiving space 8.

The following briefly describes an inventive method for connecting two components to an inventive connecting device.

Two approximately rectangular mounting recesses 40 are formed laterally in the nut device 12.

An assembly tool may be provided for inserting the nut device into the receiving space 8 of the connecting device. However, such an assembly tool is not mandatory. Alternatively, the nut device is inserted into the receiving space 8 manually.

First, the assembly tool is arranged in the mounting recesses 40 of the nut device 12. The nut device 12 can then be inserted into the receiving space 8 of the flange portion 7 through the insertion opening 16 using the assembly tool.

By correspondingly engaging the captive retention springs 39 of the nut device into the captive retention grooves 20 of the receiving space 8, the nut device is arranged captively in the receiving space. In this way, a corresponding transport safety is also formed.

To counteract unintended twisting, two dimples 41 are formed on a surface of the nut device 12 facing the flange portion 7. The dimples 41 can be arranged in correspondingly formed dimple recesses 42 of the flange portion 7 in order to secure the nut device 12 against twisting with respect to the housing device 4.

A sufficiently high torque is only applied upon threading in the screw device 38 to release the nut device 12 from this pre-assembly position.

Thereafter, the connecting device or the shaft portion 6 of the connecting device 1 is inserted into a through passage of a first component 2 in the assembly direction 13 and held in a pre-assembly position by means of the catching elements 23.

A second component 3 is then placed on a flange portion 7 of the connecting device.

Finally, the screw device is inserted through the through passage of the second component 3 and a conically tapered area of the sealing device 26 in the area of the screw through-passage such that the screw device penetrates the conically tapered area of the sealing element.

Then, a torque is exerted on a drive of the screw device.

The screw device is now inserted into the nut device of the connecting device.

Lastly, a torque is exerted on the screw device such that the nut device is rotated laterally from a pre-assembly region of the housing device into an assembly region of the screw device until the latter abuts a radial dead stop of the assembly region such that these can only be displaced opposite to the assembly direction 13 or in axial direction 5, respectively, until the retaining elements and the screw head connect the two components to each other such that these abut the sealing device 26 of the connecting wall 10 and the fastening wall 11 to form a seal. In this way, a secure and reliable connection is formed.

Another aspect provides a method of manufacturing the inventive fastening device, comprising the steps of: injection-molding a housing device described above by means of a 1-component, and preferably a 2-component injection molding process for forming the housing device from a first plastic (hard component) and a sealing element from a second plastic (soft component), Injection molding a nut device using a 1-component injection molding process.

The method of manufacture is carried out in a single manufacturing device having a plurality of machines, wherein the assembly tool is provided for laterally inserting the nut device into the housing device.

In addition, a flange portion of the housing device comprises two blind holes in order to be held by a gripping device of the manufacturing device such that the nut device can be laterally inserted with the assembly tool into a receiving space of the housing device through an insertion opening.

The inventive connecting device 1 is inserted into a first component 2, and the first component 2 is connected to a second component 3 using the connecting device 1, analogously to the methods described in the yet unpublished patent application with application number DE 10 2021 109 163 and DE 10 2017 128 842 A1. Reference to these two applications is hereby made in full.

DE 10 2017 128 842 A1 discloses a connector, wherein the connector is adapted to connect a first component to a second component, wherein the components each have an opening differing from a circular cross-section, preferably with angular, particularly preferably rectangular or square, cross-sections, wherein the connector comprises a cage portion having a radial flange at one end, and having a shaft portion different from a circular cross-section, preferably with an angular, particularly preferably rectangular or square, cross-section that can be inserted into the opening of the second component such that the flange abuts the front side of the second component, wherein the connector comprises a nut part at least partially accommodated by the cage part that is indexable from a first indexed position in the cage portion to a second indexed position,
has an axial opening for accommodate a screw fastener,
has opposing wing portions on
the exterior that are adapted
to be pulled by the rotation of the screw fastener in the nut part against a rear face of the second component after indexing the nut part from the first to the second indexing position when a head of the screw fastener abuts the first component and presses it against the flange of the cage portion, wherein the wing sections lie radially within the outer contour of the cage portion in the first indexing position and in the second indexing position project radially beyond the outer contour of the cage portion while abutting against a dead stop of the cage portion, wherein the nut part has a cylindrical portion with an outer diameter at an axial end, and wherein the cage portion in the area of the shaft portion, preferably at the end of the shaft portion opposing the flange, comprises a transverse face, preferably a bottom face, that preferably terminates the shaft portion, wherein the transverse face comprises a circular opening having an inner diameter larger than the outer diameter, wherein the nut part is arranged, or arrangeable, in the cage portion at least in the first indexing position such that the cylindrical portion projects into or through the circular opening.

This makes the assembly more reliable as the likelihood of the nut part being misaligned in the cage portion is reduced.

The nut part may be metal or plastic. The cage portion may be made of metal or plastic, but is preferably made of plastic.

Preferably, the nut part does not have a thread in the axial opening, such that a thread is only cut into the axial opening by threading in the screw fastener. Alternatively, an inner thread adapted to the screw fastener may be formed in the axial opening.

The cage portion preferably comprises one or more recesses in which the wing portions of the nut part can be arranged. Preferably, there is a dedicated recess for each wing portion. The cylindrical section is preferably so long that it projects into the circular opening over at least 20%, preferably 50%, particularly preferably 100% of the rotational movement. A further inventive connector provides that the cage portion comprises at least one, preferably two or more, first guide regions having an angled face area oblique to the tangential direction, preferably in the range of 5° to 70°, particularly preferably about 20°, and the nut part comprises at least one, preferably two or more, radial projections whose axial end face has a second guide region having an angled face area oblique to the tangential direction, preferably in the range of 5° to 70°, particularly preferably about 20° that is preferably adapted to the first guide region. This facilitates rotation of the nut part, which facilitates assembly of the connector. The radial projection may have a second guide region on both axial sides or only on one axial side.

Preferably, the radial projection comprises the second guide region on the side facing away from the flange region of the cage portion. The radial projection is preferably formed in part by the wing portion. Preferably, the radial projection is larger than the wing portion in the tangential direction and includes the latter. Preferably, the first guide region and the second guide region are in partial regions respectively convex and/or concave in relation to each other in order to obtain smoother transitions.

Alternatively, the radial projection is formed by, or coincides with, a partial region of the wing portion.

Preferably, one of the recesses of the cage portion, preferably all recesses, comprise(s) the first guide area as the recess edge. Preferably, the first guide region is arranged between two substantially axially aligned dead stop regions of the recess(es) serving as a dead stop of the second indexing position and as a dead stop of the second indexing position, each forming a dead stop for the first and second indexing position of the nut part.

A further inventive connector provides that the face area of the second guide region is beveled correspondingly over a tangential angle range of at least 10°, preferably a maximum of 120°, particularly preferably about 80-90°. This results in a particularly effective guide.

A further inventive connector provides that the cage portion and the nut part can be snapped together in the first indexing position such that the nut part can only be rotated to the second indexing position after overcoming a certain threshold torque. This facilitates assembly as the nut part is more reliably aligned in the first indexing position at the start of the assembly operation.

A further inventive connector provides that one of of the cage portion and the nut part comprises a radial, preferably rounded, preferably axially rounded on both sides, preferably annular catch projection that is adapted to snap behind a radial projection of the other of the cage portion and the nut part when the nut part is in the first indexing position. A snap mechanism is as a result easily implemented.

A further inventive connector provides that the nut part comprises the catch projection, and that the catch projection is arranged in or adjacent to the cylindrical section such that the catch projection is adapted to snap behind the inner edge of the circular opening in the first indexing position. This facilitates a simple design that takes advantage of an already existing inner edge of the cage portion.

The catch projection preferably has an outer diameter greater than the inner diameter of the circular opening.

Alternatively, the nut part comprises the catch projection or a catch groove serving as the inner edge axially in the region or above the wing portions.

LIST OF REFERENCE NUMERALS

1 Connecting device
2 First component
3 Second component
4 Housing device
5 Axial direction
6 Shaft portion
7 Flange portion
8 Receiving space
9 Screw through-passage
10 Connecting wall
11 Fastening wall
12 Nut device
13 Assembly direction
14 Bottom wall
15 Connecting wall
16 Insertion opening
17 Pre-assembly region
18 Assembly region
19 Insertion slope
20 Captive retention groove
21 First overmolding edge
22 Second overmolding edge
23 Catching element
24 Locking surface
25 Final assembly position
26 Sealing device
27 Sealing lip
28 Sealing struts
29 Screw sealing element
30 Insertion opening
31 Inner thread
32 Retaining element
33 Retaining surface
34 Drive
35 Screw head
36 Inner thread
37 Mounting flange
38 Screw device
39 Captive retention spring
40 Mounting recess
42 Dimple
43 Dimple mating recess

The invention claimed is:

1. A connecting device for connecting two components, comprising:
a housing device, with an axial shaft portion delimiting a receiving space and a radial flange portion having a screw through-passage terminating into the receiving space, wherein a face of the flange portion facing the shaft portion is a connecting wall and a face of the shaft portion opposite the connecting wall is a fastening wall, wherein the axial shaft portion is adapted for insertion into a through passage of a first component, and
a nut device rotatably arranged in the receiving space so as to be rotatable relative to the housing device between a pre-assembly position and an assembly position, wherein the nut device can be inserted laterally into the receiving space.

2. The connecting device according to claim 1, wherein the shaft portion is approximately rectangular and comprises a bottom wall that is connected to the flange portion by two diametrically opposed wall sections, wherein at least one lateral insertion opening is provided between the wall sections, and wherein the insertion opening is adapted for lateral insertion of the nut device into the receiving space.

3. The connecting device according to claim 2, wherein the nut device comprises at least one retaining element extending radially outward, wherein a plate-shaped component can be fixed in a final assembly position between the retaining element and the connecting wall and/or wherein a further plate-shaped component can be fixed between the fastening wall and a screw head of a screw device.

4. The connecting device according to claim 3, wherein a pre-assembly receiving area is provided in the area of the bottom wall for accommodating the retaining element of the nut device in the pre-assembly position, in which the nut device can be arranged in an axially fixed location, wherein, when a torque is exerted on a screw head of the screw device, an inner thread is cut into a bore of the nut device, or wherein the inner thread is already pre-formed such that an external thread of a screw device engaged with the inner thread of the nut device allows the nut device to be laterally rotatable from the pre-assembly receiving area into an assembly region of the receiving space and the nut device is axially displaceable in the assembly region until the final assembly position is reached.

5. The connecting device according to claim 2, wherein on the wall sections, catching elements extend radially outward and diametrically opposite one another and are adapted to engage behind a through passage of a component.

6. The connecting device according to claim 1, wherein the radial flange portion is formed with a sealing device that forms a seal when a first component abuts the connecting wall and/or that forms a seal when a second component abuts the fastening wall and/or that forms a seal by delimiting the screw through-passage.

7. The connecting device according to claim 6, wherein the sealing device is formed from a soft component, wherein an integral chemical bond is made to the flange portion by means of a 2-component injection molding process.

8. A connection system, comprising:
a connecting device according to claim 1,
a screw device, and
an assembly tool for laterally inserting a nut device into a receiving space of the connecting device.

9. The connecting system according to claim 8, wherein the tool is a fork-like assembly tool, and
the nut device comprises two lateral receiving recesses for accommodating the fork-like assembly tool for inserting the nut device into the receiving space.

10. A method for connecting two components using a connecting device, in particular according to claim 1, comprising the following steps:
laterally insert the nut device into a receiving space of a housing device of the connecting device,
insert the connecting device, in particular a shaft portion of the connecting device, into a through passage of a first of the two components to be connected,
arrange a through passage of a second component on a flange portion of the connecting device,
insert a screw device into the through passage of the second component and into a conically tapered region of a sealing element of the connecting device,
penetrate the conically tapered region of the sealing element with the screw device, by applying a torque on a drive of the screw device,
insert the screw device into the nut device of the connecting device, and
exert a torque on the screw device such that the nut device is rotated laterally from a pre-assembly region of the housing device into an assembly region of the screw device, and axially displace the nut device in the assembly region, to create a positive locking sealed connection between retaining elements of the nut device, the first component, the flange portion, the second component and a screw head of the screw device.

11. A connecting device for connecting two components, comprising:
a housing device, with an axial shaft portion delimiting a receiving space and a radial flange portion having a screw through-passage terminating into the receiving space, wherein a face of the flange portion facing the shaft portion is a connecting wall and a face of the shaft portion opposite the connecting wall is a fastening wall,
wherein the axial shaft portion is adapted for insertion into a through passage of a first component, and
a nut device rotatably arranged in the receiving space, wherein the nut device can be inserted laterally into the receiving space,
wherein the axial shaft portion comprises a bottom wall that is connected to the flange portion by wall sections, wherein at least one lateral insertion opening is provided between the wall sections,
wherein, on each wall section, a catching element extends outward and is adapted to engage behind a through passage of a component.

* * * * *